(12) United States Patent
Boelling

(10) Patent No.: US 8,758,148 B2
(45) Date of Patent: Jun. 24, 2014

(54) TORSIONAL VIBRATION DAMPER HAVING SLIDING SHOES AND A SPACING LIMITATION DEVICE

(75) Inventor: Jochen Boelling, Baden-Baden (DE)

(73) Assignee: BorgWarner Inc., Auburn Hills, MI (US)

( * ) Notice: Subject to any disclaimer, the term of this patent is extended or adjusted under 35 U.S.C. 154(b) by 20 days.

(21) Appl. No.: 13/187,785

(22) Filed: Jul. 21, 2011

(65) Prior Publication Data

US 2012/0028722 A1 Feb. 2, 2012

(30) Foreign Application Priority Data

Jul. 28, 2010 (DE) .......................... 10 2010 032 536

(51) Int. Cl.
*F16F 15/121* (2006.01)
(52) U.S. Cl.
USPC ...................................... 464/68.92
(58) Field of Classification Search
USPC ........ 464/62.1, 68.92; 192/205; 267/169, 170
See application file for complete search history.

(56) References Cited

U.S. PATENT DOCUMENTS

| | | | | | |
|---|---|---|---|---|---|
| 495,687 | A | * | 4/1893 | Trethewey | ............... 464/62.1 X |
| 1,889,698 | A | * | 11/1932 | Reed | ...................... 464/68.92 X |
| 4,518,071 | A | * | 5/1985 | Nozawa | |
| 6,273,227 | B1 | * | 8/2001 | Ohkubo | ................... 192/205 X |
| 7,340,894 | B2 | * | 3/2008 | Miyahara et al. | |
| 7,350,774 | B2 | * | 4/2008 | Chun et al. | ................ 267/169 X |

FOREIGN PATENT DOCUMENTS

WO 2008071281 6/2008

* cited by examiner

*Primary Examiner* — Gregory Binda
(74) *Attorney, Agent, or Firm* — BrooksGroup

(57) ABSTRACT

One embodiment may include a torsional vibration damper having a primary element, a secondary element and a spring device for torsionally elastic coupling of the primary and the secondary element in the circumferential direction, which spring device has at least one spring element, which is arranged between a first and a second sliding shoe, a spacing limitation device being provided to define a maximum spacing ($A_{max}$) between the first and the second sliding shoe in the circumferential direction. The spacing limitation device may extend through the at least one spring element in the circumferential direction.

30 Claims, 8 Drawing Sheets

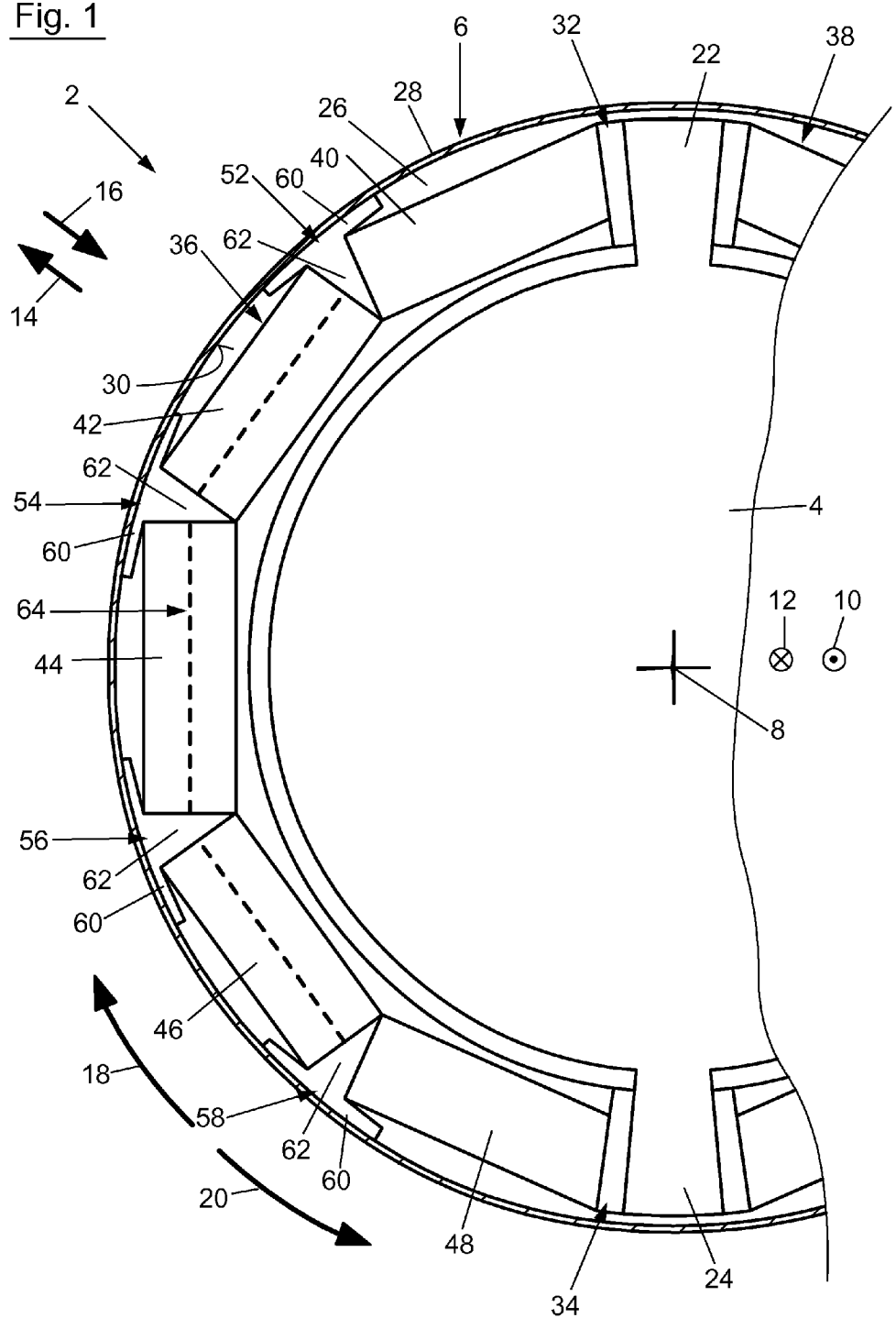

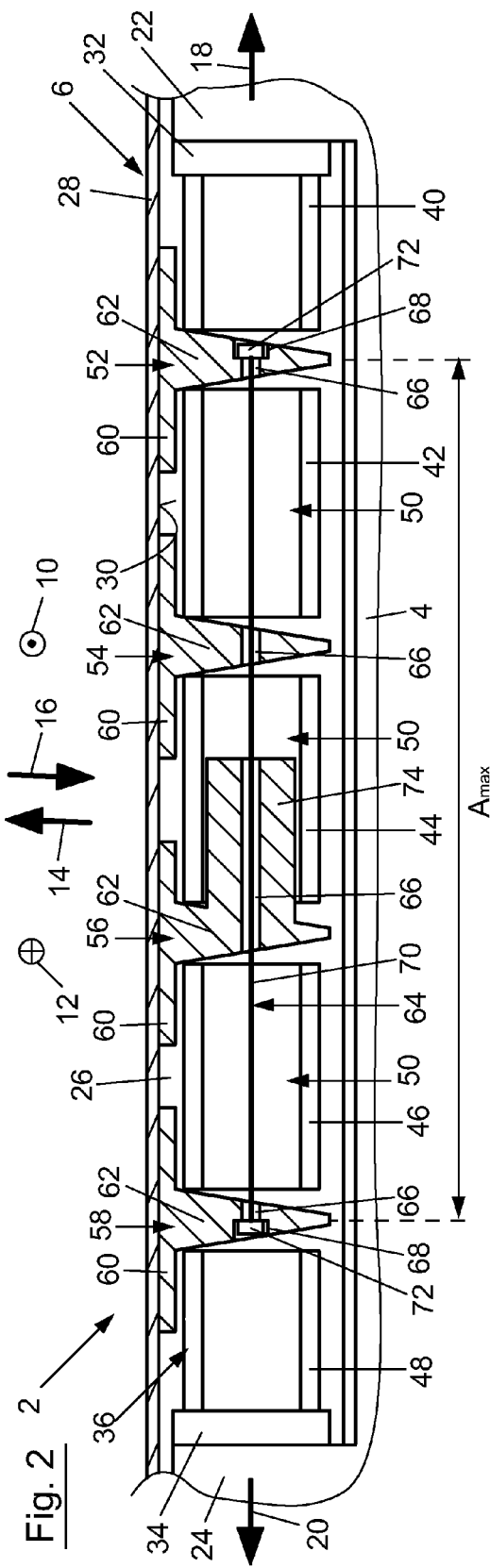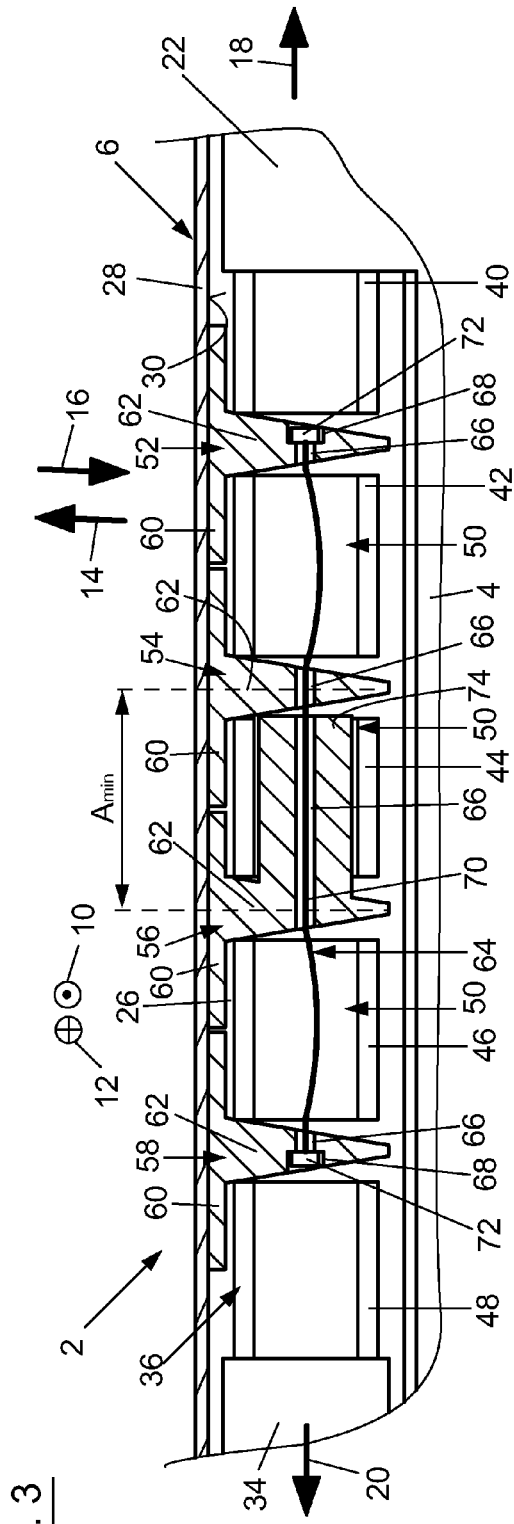

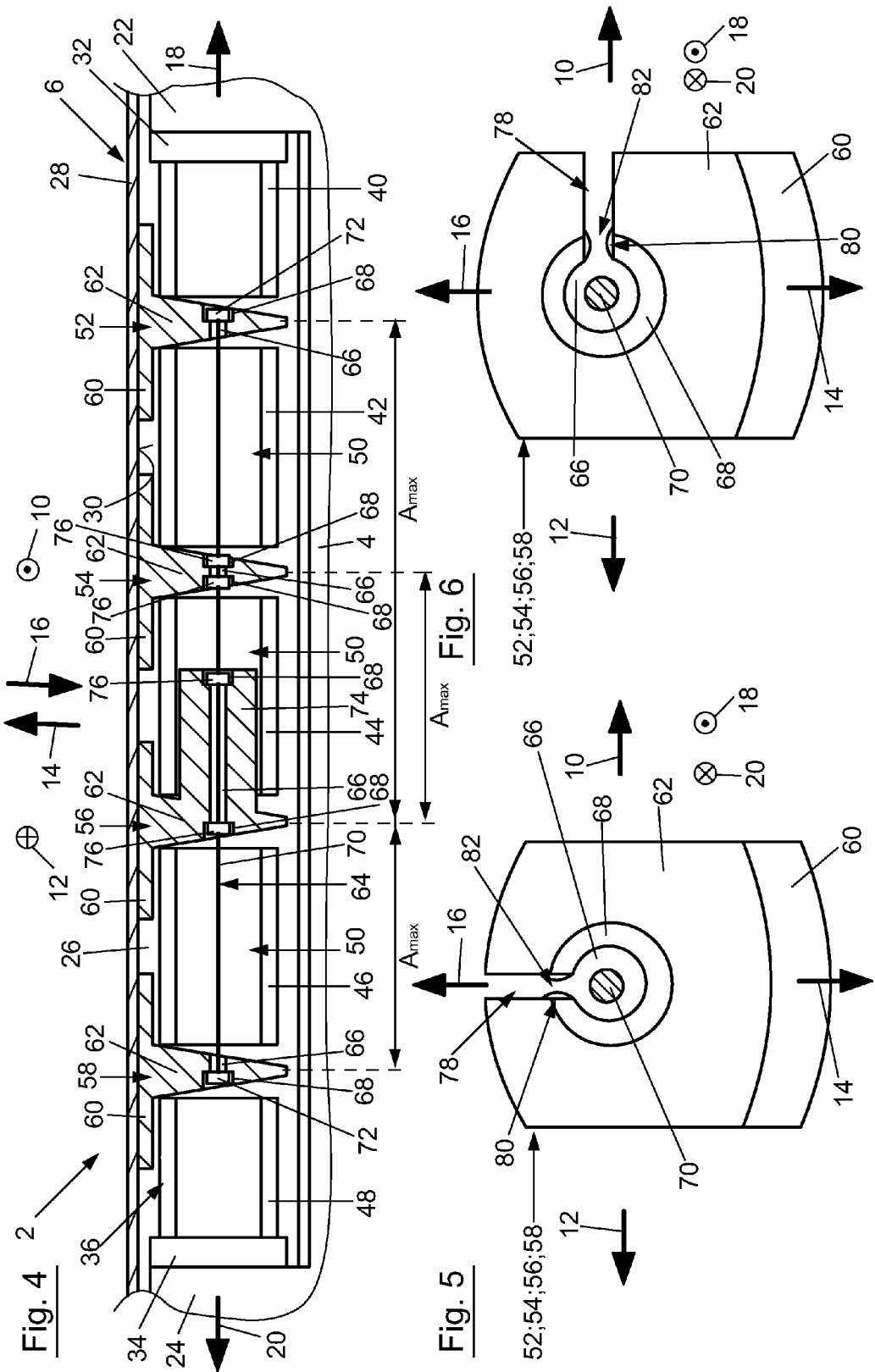

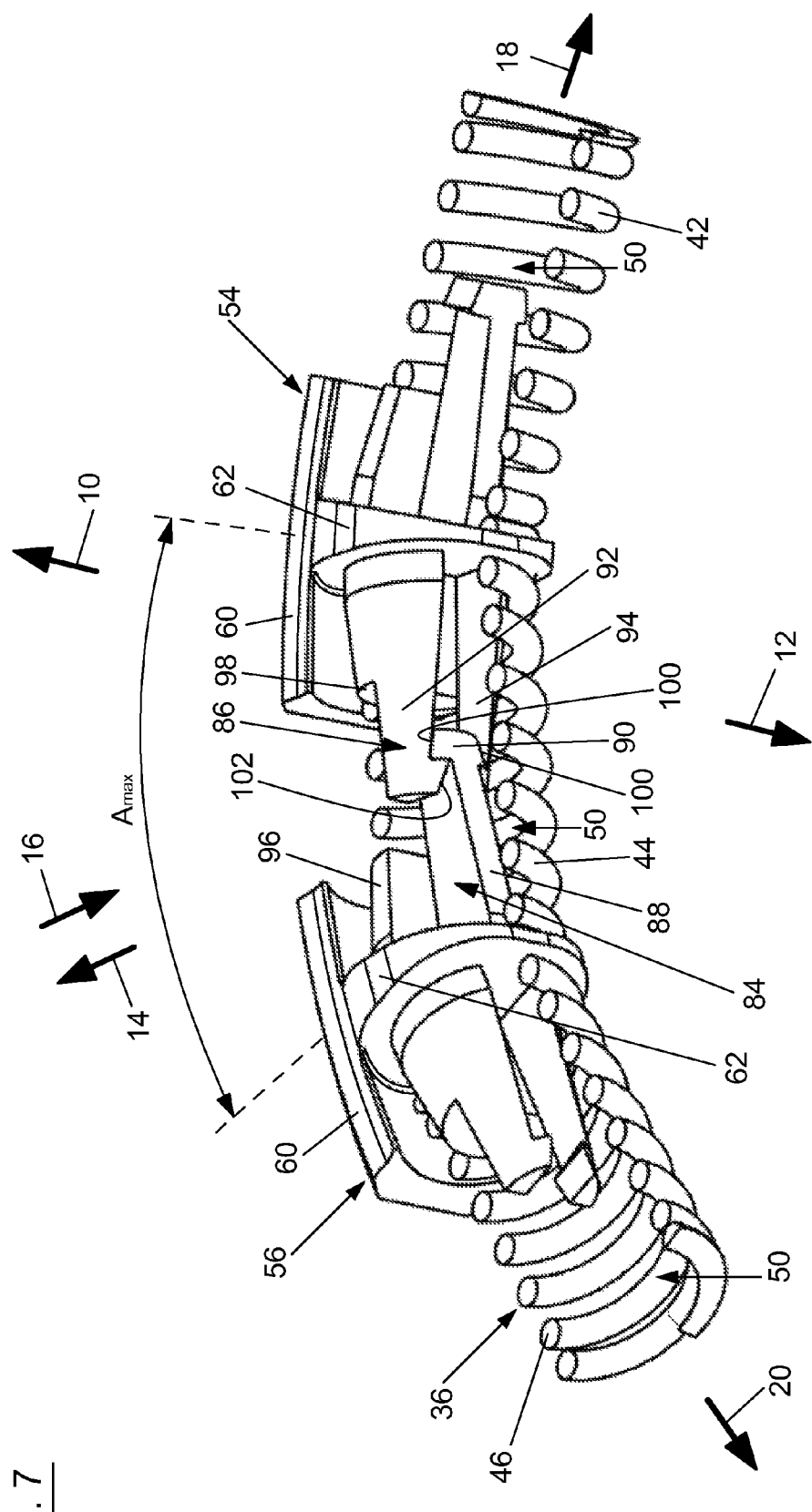

TORSIONAL VIBRATION DAMPER HAVING SLIDING SHOES AND A SPACING LIMITATION DEVICE

Figure 8:
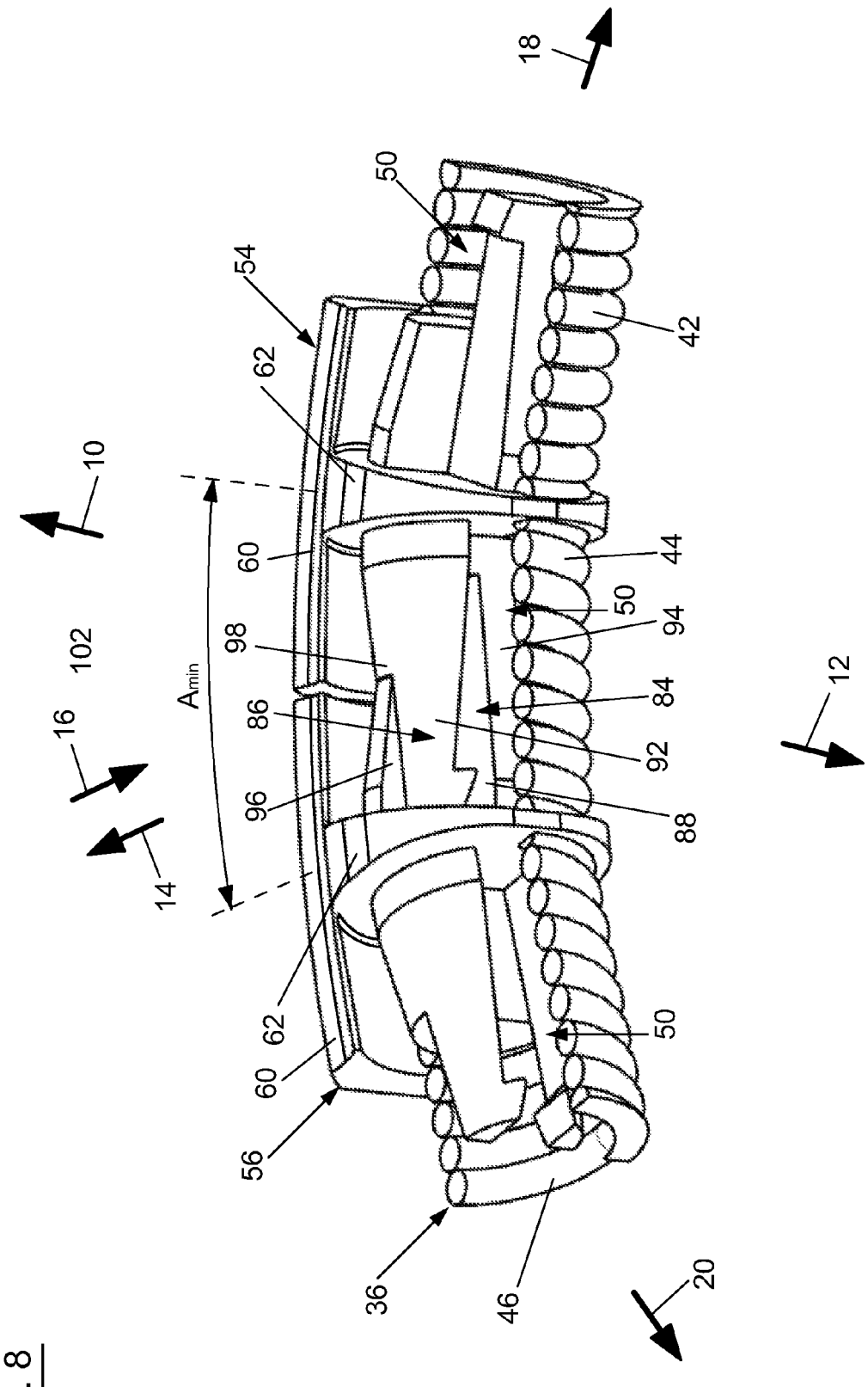

The present invention relates to a torsional vibration damper having a primary element, a secondary element and a spring device for torsionally elastic coupling of the primary and the secondary element in the circumferential direction, which spring device has at least one spring element, which is arranged between a first and a second sliding shoe, a spacing limitation device being provided to define a maximum spacing between the first and the second sliding shoe in the circumferential direction.

WO 2008/071281 A1 describes a torsional vibration damper having a primary element and a secondary element. Two spring devices are provided between the drivers of the primary and the secondary element, serving to provide rotationally elastic coupling of the primary and the secondary element in the circumferential direction. The spring devices each have a plurality of spring elements arranged one behind the other in the circumferential direction, between which "sliding shoes" in the form of intermediate shoes are arranged, a further sliding shoe in the form of an "end shoe" being arranged on each of the ends of the respective spring device, which ends face in the circumferential direction. One of the spring elements is arranged between the end shoe and the intermediate shoe adjacent to the end shoe. To prevent said end shoe from moving away from the spring device to such an extent that it is no longer possible for the end shoe to act on the spring device or on said spring element thereof between the end shoe and the intermediate shoe, a spacing limitation device for limiting the maximum spacing between the end shoe and the intermediate shoe in the circumferential direction is provided between the end shoe and the intermediate shoe. This spacing limitation device, which can be a restraining line or restraining arm for example, is arranged outside the spring element, i.e. outside the spring interior space of the spring element, which is designed as a helical spring, and is intended to act between the sliding sections of the end shoe and the intermediate shoe, by means of which the end shoe and the intermediate shoe are supported in sliding fashion in the radial direction.

The spacing limitation device within the known torsional vibration damper has proven its worth but is subject to a number of disadvantages. Thus, first of all, it has been found that the spacing limitation device acting between the sliding sections of the end shoe and the intermediate shoe affects the friction characteristics between the spring device and the component surrounding the spring device during the sliding support of the spring device on said component in the radial direction and, depending on the application, this can lead to increased wear in the region of the sliding section or in the region of the sliding surfaces of the surrounding component of the torsional vibration damper. Moreover, loss of the spring owing to the drifting apart of the end shoe and the intermediate shoe up to the defined maximum spacing is not excluded by the known spacing limitation device alone. Furthermore, the assembly of the known torsional vibration damper has proven to be relatively difficult and/or involved.

It is therefore an object of the present invention to provide a torsional vibration damper having a spring device, which has at least one spring element, a first sliding shoe, a second sliding shoe and a spacing limitation device for defining a maximum spacing between the first and the second sliding shoe in the circumferential direction, which damper has improved friction characteristics, thus reducing the wear in the region of the sliding shoes and of the sliding surface adjoining the sliding shoes and ensuring increased security against loss of the spring in combination with relatively low design complexity and ease of assembly.

The torsional vibration damper according to the invention has a primary element and a secondary element. The primary element of a torsional vibration damper is conventionally taken to mean the element associated with the input side of the torsional vibration damper, e.g. the engine, while the secondary element of a torsional vibration damper is conventionally taken to mean the element which is associated with the output side of the torsional vibration damper, e.g. the transmission. However, the present invention also includes embodiments in which the primary element is associated with the output side and the secondary element is associated with the input side. The torsional vibration damper according to the invention furthermore comprises at least one spring device for torsionally elastic coupling of the primary and the secondary element in the circumferential direction, and two such spring devices are preferably provided for torsionally elastic coupling of the primary and the secondary element in the circumferential direction. The spring device has at least one spring element, although preferably a plurality of spring elements is provided, of which particularly preferably at least two are arranged in series. In addition, the spring device has a first and a second sliding shoe, between which said spring element is arranged. The first and the second sliding shoe can be two sliding shoes that are adjacent in the circumferential direction, but it is equally possible for additional sliding shoes to be provided between the first and the second sliding shoe, so that the first and the second sliding shoe do not necessarily have to be arranged adjacent to one another in the circumferential direction. In order to prevent the first and the second sliding shoe from moving too far apart in the circumferential direction during the operation of the torsional vibration damper, a spacing limitation device is furthermore provided to define a maximum spacing between the first and the second sliding shoe in the circumferential direction. According to the invention, the spacing limitation device extends through the at least one spring element in the circumferential direction.

From the preceding description, it is evident that, in contrast to the torsional vibration damper according to WO 2008/071281 A1, the spacing limitation device in the torsional vibration damper according to the invention is not arranged outside the spring element between the first and the second sliding shoe but instead extends through the at least one spring element in the circumferential direction, and this is associated with various advantages which will be explained below. Thus, it should be noted first of all that a spacing limitation device extending through the at least one spring element offers particularly good use of installation space, especially since, in the case of the helical springs conventionally used as spring elements, the spring interior space surrounded by the turns of the helical spring is generally not used or, at most, is used by additional spring elements inserted parallel to the outer spring element. Therefore, the installation space taken up by the spring device is reduced. Moreover, this ensures that the spacing limitation device extending through the at least one spring element does not come into contact with the sliding surface of the torsional vibration damper during the operation of the torsional vibration damper, at which surface the sliding shoes of the spring device are supported in a sliding manner. In this way, both wear on the spacing limitation device itself and on the sliding surface of the torsional vibration damper is avoided. Moreover, the spacing limitation device not only effects definition of the maximum spacing between the first and the second sliding shoe in the circumferential direction; rather, the spacing limitation device also permits captive arrangement of the spring element between the first and the second sliding shoe, especially since a spring element slipping transversely to the circumferential direction must necessarily be supported on the spacing limitation device, which extends through the spring element. Thus, the spacing limitation device on the one hand performs the function of defining the maximum spacing between the first and the second sliding shoe and, on the other hand, performs the function of holding the spring element captive in the set position thereof between the first and the second sliding shoe without the need for additional securing means, thus simplifying the construction of the torsional vibration damper according to the invention. This has the further advantage of simplified assembly, especially since the individual components of the spring device, i.e. the sliding shoes and spring elements, can be joined together first of all with the aid of one or more spacing limitation devices to give an interlinked module, so as then to introduce said module as a whole into the torsional vibration damper. Here too, the spacing limitation device prevents the spring element becoming detached from the sliding shoes or vice versa, and therefore the handling of such a module is particularly simple.

In a preferred embodiment of the torsional vibration damper according to the invention, the at least one spring element is formed by a helical spring. As already indicated above, in this embodiment the spring interior space surrounded by the turns of the helical spring can be used by the spacing limitation device, thus making possible a compact construction of the spring device without special adaptation of the spring element. Although the helical spring can also be an "arcuate spring", it is nevertheless preferred in this embodiment if the helical spring is designed as a helical spring that is straight or extends in a straight line. If the helical springs are an outer and an inner helical spring, in which case the latter would then be arranged within the spring interior space of the outer helical spring, it is furthermore preferred in this embodiment if the spacing limitation device extends through the inner helical spring in the circumferential direction in order to prevent the operation of the helical springs being affected by the spacing limitation device and vice versa.

In principle, the spacing limitation device could be designed in such a way that it effects a material connection between the first and the second sliding shoe. However, this would make the production of the sliding shoes and the subsequent assembly of the spring device more difficult, and therefore the spacing limitation device in another preferred embodiment of the torsional vibration damper according to the invention interacts with the first and the second sliding shoe in such a way that the first and the second sliding shoe are connected positively to one another when the maximum spacing is reached, preferably being hooked to one another.

In another preferred embodiment of the torsional vibration damper according to the invention, the first and the second sliding shoe each have a sliding section for sliding support of the sliding shoe in the radial direction, and a supporting section for supporting the spring element in the circumferential direction, the spacing limitation device acting between the supporting sections. In contrast to the spacing limitation device in WO 2008/071281 A1, the spacing limitation device thus does not act between the sliding sections but instead between the supporting sections of the first and the second sliding shoe. In this way, there is no need for adaptation of the sliding section of the sliding shoes, as would be required for fastening the spacing limitation device. Consequently, the already wear-prone sliding section of the sliding shoes is relieved of load, thus extending the life of the sliding shoes. Moreover, the interaction between the spacing limitation device and the supporting sections ensures appropriate positioning of the spacing limitation device, thus enabling the latter to extend into and through the spring element over a particularly short distance. In this embodiment, it is furthermore preferred if the sliding section extends in the circumferential direction, while the supporting section extends in the radial direction, preferably inward in the radial direction starting from the sliding section.

In an advantageous embodiment of the torsional vibration damper according to the invention, at least the first sliding shoe and preferably also the second sliding shoe is/are designed as an end shoe of the spring device. In this context, the term "end shoe of the spring device" is taken to mean the sliding shoe which is arranged closest to the driver of the primary or secondary element of the torsional vibration damper in the circumferential direction. At the same time, the end shoe does not have to directly adjoin said drivers; on the contrary, it is also possible for one of the abovementioned spring elements to be provided between the driver and the end shoe. In general, therefore, a spring device has two end shoes. If both the first and the second sliding shoe are designed as end shoes, the spacing limitation device effects limitation of the maximum extension of the spring device in the circumferential direction by defining the maximum spacing.

In a particularly preferred embodiment of the torsional vibration damper according to the invention, the spacing limitation device is designed as a cable, preferably as a steel cable. In this embodiment, it is furthermore preferred if the cable is not of elastic design and can therefore not be extended elastically so as to achieve precise definition of the maximum spacing between the first and the second sliding shoe in the circumferential direction. The use of a spacing limitation device designed as a cable has the advantage that the cable requires only a small amount of installation space and can nevertheless accept large tensile forces so as to precisely define the maximum spacing between the first and the second sliding shoe in the circumferential direction. Owing to the small overall size of the cable, said cable can be used even when helical springs with a particularly small spring interior space, through which the cable must extend, are provided. Moreover, production of the spacing limitation device is simplified, especially since it is possible to employ standard cables or standard steel cables.

In order to achieve particularly reliable interaction between the spacing limitation device designed as a cable and the supporting sections without significantly increasing the outlay on production, the cable in another particularly preferred embodiment of the torsional vibration damper according to the invention extends through an aperture in the supporting section of the first and/or second sliding shoe. In this embodiment, the cable furthermore has a stop part, by means of which engagement behind the supporting section of the first and/or second sliding shoe can be or is achieved. In a simple and reliable manner, the stop part thus prevents the cable from being pushed through the aperture in the supporting section since the stop part strikes against one side of the supporting section at the latest when the maximum spacing between the first and the second sliding shoe is reached, thus preventing further separation of the first sliding shoe from the second sliding shoe in the circumferential direction. The stop part is preferably a thickened portion of the cable, a knot in the cable or a press-fitted part, which is press-fitted onto the cable or is clamped to the latter. In any case, the stop part should be provided in such a way that it can be slid along the cable to only a limited extent or not at all so as to achieve precise definition of the maximum spacing between the first and the second sliding shoe in the circumferential direction.

As already indicated above, the first and the second sliding shoe do not necessarily have to be sliding shoes of the spring device which are arranged adjacent to one another in the circumferential direction. Thus, in a particularly advantageous embodiment of the torsional vibration damper according to the invention, the spring device has at least two or more spring elements, and intermediately situated sliding shoes are arranged between the first and the second sliding shoe in the circumferential direction, said intermediately situated shoes in turn being arranged between the spring elements. In this embodiment, the cable extends through the two or more spring elements in the circumferential direction, the sliding shoes, i.e. the first sliding shoe, the second sliding shoe and the intermediately situated sliding shoes, being connected in the manner of a chain by the cable. During assembly, the components of the spring device, namely the first sliding shoe, the second sliding shoe, the intermediately situated sliding shoes and the spring elements can thus first of all be assembled to form a module that is linked together like a chain before this interlinked module that forms the spring device is inserted into the torsional vibration damper. This significantly simplifies the assembly of the torsional vibration damper.

In another preferred embodiment of the torsional vibration damper according to the invention, which is based on the embodiment described above, each of the intermediately situated sliding shoes has a sliding section, preferably extending in the circumferential direction, for sliding support of the intermediately situated sliding shoe in the radial direction, and a supporting section, preferably extending in the radial direction, for supporting the spring element in the circumferential direction, the spacing limitation device designed as a cable interacting with the supporting section of the respective intermediately situated sliding shoe. As already explained above with reference to the first and the second sliding shoe, this brings about a particularly appropriate arrangement of the spacing limitation device in the region of the spring elements without the need for the sliding section of the intermediately situated sliding shoes to be changed, modified or adapted in a way which prejudices the life of the sliding section.

In another advantageous embodiment of the torsional vibration damper according to the invention, the cable extends through an aperture in the supporting section of the respective intermediately situated sliding shoe in order to achieve interaction between the cable and the supporting section of the respective intermediately situated sliding shoe. In this embodiment, the cable can be adapted to the aperture in such a way that the respective intermediately situated sliding shoe can be slid along the cable in order to keep down the outlay for the spacing limitation device in the form of the cable. However, it is also possible to employ a different variant embodiment, which is described below.

Thus, in another preferred embodiment of the torsional vibration damper according to the invention, the cable has at least one additional stop part, preferably a thickened portion, a knot or a press-fitted part, by means of which engagement behind the supporting section of the respective intermediately situated sliding shoe can be or is achieved, thereby defining a maximum spacing in the circumferential direction between the intermediately situated sliding shoe, on the one hand, and another or adjacent sliding shoe, on the other hand. This has the advantage that the spacing limitation device not only defines the maximum spacing between the first and the second sliding shoe in the circumferential direction but additionally defines a maximum spacing between one or all of the intermediately situated sliding shoes and another sliding shoe of the spring device. This counteracts loss of the spring in a particularly reliable way.

In order to simplify the introduction of the cable forming the spacing limitation device into the aperture in the supporting sections of the first sliding shoe, the second sliding shoe and/or the intermediately situated sliding shoes and hence facilitate assembly, another particularly advantageous embodiment of the torsional vibration damper according to the invention includes the provision of a receiving slot in at least one of the supporting sections, via which slot the cable can be or is introduced into the aperture transversely to the circumferential direction. In this embodiment, the cable therefore does not have to be threaded into the aperture in the circumferential direction, and assembly is thus significantly simplified.

In order reliably to exclude the possibility that the cable may unintentionally slide out through the receiving slot within the aperture in the embodiment described above, another advantageous embodiment of the torsional vibration damper according to the invention includes the provision of a retaining feature for retaining the cable arranged within the aperture. A retaining feature of this kind can consist, for example, in the receiving slot opening into the aperture in the axial direction, at least in the section thereof adjoining the aperture, and not in the radial direction for instance, thus preventing the cable from sliding out through the receiving slot purely by virtue of its own weight. As an alternative or an addition, it is particularly preferred in this embodiment if the retaining feature is formed by a constriction in the receiving slot, allowing the cable to be pulled out of the aperture transversely to the circumferential direction through the constriction in the receiving slot only by exerting an increased force. The retaining feature, more particularly the constriction in the receiving slot, ensures reliable and long-lasting operation of the spacing limitation device in the form of the cable and, furthermore, ensures that the spring device constructed as an interlinked module is simple to handle during assembly without individual components of the spring device, especially the sliding shoes, being lost during the insertion of the modular spring device into the torsional vibration damper.

In principle, the apertures in the supporting section can have a cross section that remains constant in the circumferential direction. However, it has proven advantageous if at least one of the apertures in the supporting section is widened in the circumferential direction to form a receiving recess, in which the stop part can be or is at least partially, and preferably completely, accommodated, as is the case in another preferred embodiment of the torsional vibration damper according to the invention. In this way, the stop part is prevented from moving too far away from the supporting section and possibly entering into areas in which the stop part will have a negative effect on other functional components of the torsional vibration damper, such as a spring element of the spring device. In this context, it is furthermore particularly preferred in the embodiment under consideration if the stop part is held in the receiving recess by means of a clamping action.

In another preferred embodiment of the torsional vibration damper according to the invention, the spacing limitation device has a first connecting means on one sliding shoe, preferably on the supporting section of the one sliding shoe, and a second connecting means on the other sliding shoe, preferably on the supporting section of the other sliding shoe, said connecting means extending into the spring element in the circumferential direction and engaging one behind the other. In this embodiment, it is furthermore preferred if the connecting means are formed integrally with the respective sliding shoe, particularly preferably with the supporting section of the respective sliding shoe. In this way, a positive connection between the mutually adjacent sliding shoes is accordingly also achieved, and the individual sliding shoe with the connecting means provided integrally thereon is relatively simple to produce. Moreover, the spacing limitation device does not have to be arranged or fastened on the sliding shoes in a separate method step during the assembly of the spring device, owing to the integral formation of the connecting means with the respective sliding shoe, and therefore assembly is a relatively simple matter. In this embodiment, it is furthermore preferred if the two mutually associated connecting means are each of hook-shaped design in order to allow simple positive engagement one behind the other. It is furthermore evident from the above description that a spacing limitation device of this kind only ever acts between sliding shoes that are adjacent to one another in the circumferential direction, with the result that it is possible in this embodiment to employ a plurality of spacing limitation devices in a similar way between the respective mutually adjacent sliding shoes. In order to ensure the integral construction of the connecting means with the respective sliding shoe or the respective supporting section of the sliding shoe, the connecting means are preferably produced as part of the original forming process for the respective sliding shoe.

In order to further simplify the assembly of the spring device and thus the assembly of the torsional vibration damper overall, the connecting means of the spacing limitation device can be or are brought together in the circumferential direction with a latching action, so that they engage one behind the other. The desired positive connection between the connecting means of the spacing limitation device can thus be produced in a particularly rapid and simple manner. It is preferred here if the connecting means can be brought together in a manner which involves elastic deformation of at least one of the connecting means. This means that at least one of the connecting means is elastically deformable. In this embodiment, it is furthermore particularly preferred if the connecting means can also be brought together with—at least temporary—elastic deformation of the surrounding spring element or with—at least temporary—elastic expansion of the helical spring. Although this makes it more difficult to bring together the connecting means for the purpose of latching the latter, especially as the surrounding spring element also has to be deformed elastically—at least temporarily—in the process, this also prevents unintentional separation of the connecting means from one another during the operation of the torsional vibration damper, especially since such separation would once again have to take place with—at least temporary—elastic deformation of the surrounding spring element or with elastic expansion of the helical spring.

As an alternative or in addition to the embodiment described above, the connecting means in another advantageous embodiment of the torsional vibration damper according to the invention can be transferred, by a movement transverse to the circumferential direction, into the position in which the connecting means engage one behind the other. This furthermore ensures that the connecting means have a certain freedom of movement transversely to the circumferential direction and relative to one another without the reliable interlinking in the circumferential direction between the mutually adjacent sliding shoes being put at risk when the maximum spacing between the mutually adjacent sliding shoes in the circumferential direction is reached.

As already indicated above, it is possible, in a particularly simple embodiment, for each of the connecting means of the spacing limitation device to be of hook-shaped design, i.e. to be designed as a hook-shaped element. To achieve particularly reliable interlinking between the mutually associated connecting means, the embodiment described below has proven particularly advantageous. Thus, in another particularly preferred embodiment of the torsional vibration damper according to the invention, the first connecting means has a head, behind which engagement is possible, while the second connecting means has at least two hook-shaped elements, between which the head of the first connecting means can be or is introduced in such a way that there can be or is engagement behind the head by the hook-shaped elements. In order to ensure particularly secure interlinking between the connecting means, it is furthermore preferred in this embodiment if the hook-shaped elements can engage or do engage behind the head on opposite sides. In a particularly simple embodiment, the second connecting means can have just two hook-shaped elements, but three, four or more hook-shaped elements that engage behind the head of the first connecting means, preferably in a uniform manner, are also conceivable. In this embodiment, it is furthermore particularly preferred if at least two of the hook-shaped elements of the second connecting means are arranged opposite one another in the axial direction, the term "axial direction" here being intended to mean the axial direction of the torsional vibration damper.

In order to further simplify the abovementioned bringing together of the connecting means in the circumferential direction with a latching action thereof, the connecting means in another advantageous embodiment of the torsional vibration damper according to the invention have surface sections oriented obliquely to the circumferential direction, which surface sections can be or are supported on one another in a sliding manner when the connecting means are being brought together. As already mentioned above, the process of bringing together preferably takes place in a manner which involves elastic deformation of at least one of the connecting means. As an alternative, it may be sufficient if just one of the connecting means has the surface section oriented obliquely to the circumferential direction in order to simplify the bringing together of the connecting means with a latching action thereof, but it has proven advantageous if both connecting means have at least one surface section oriented obliquely to the circumferential direction.

In another advantageous embodiment of the torsional vibration damper according to the invention, in which the spacing limitation device is formed by the abovementioned connecting means, at least one of the two connecting means is designed in such a way that the supporting section can be or is supported in the circumferential direction on the adjacent sliding shoe via the connecting means, thereby defining a minimum spacing between mutually adjacent sliding shoes, without the sliding sections of the mutually adjacent sliding shoes being supported on one another in the circumferential direction. In this way, the sliding section is relieved of load and protected from damage, while said connecting means serves to define the minimum spacing between the mutually adjacent sliding shoes. In this embodiment, there would thus be no need for any additional projecting stop to define the minimum spacing, especially as this function is likewise fulfilled by at least one of the connecting means. Consequently, a particularly simple sliding shoe that saves on materials is thereby created. In this embodiment, however, it is possible that the connecting means will be damaged or at least restricted in its operation, depending on the strength and elasticity of said connecting means. If a connecting means with a lower strength or a higher elasticity is used, the embodiment described below is therefore preferred.

Thus, in another particularly preferred embodiment of the torsional vibration damper according to the invention, at least one of the supporting sections has a projecting stop which extends into the spring element and by means of which the supporting section can be or is supported in the circumferential direction on the adjacent sliding shoe, thereby defining a minimum spacing between mutually adjacent sliding shoes, without the sliding sections of the mutually adjacent sliding shoes being supported on one another in the circumferential direction and/or one of the connecting means being supported in the circumferential direction on the adjacent sliding shoe. This embodiment of the torsional vibration damper can be applied both to a torsional vibration damper with a spacing limitation device in the form of a cable and to a torsional vibration damper with a spacing limitation device made up of the connecting means described above in order to define the minimum spacing between mutually adjacent sliding shoes of the spring device and to protect the sliding sections of the sliding shoes and, if appropriate, the connecting means from damage. The minimum spacing mentioned herein can also be referred to as a smallest possible spacing.

Figure 9:
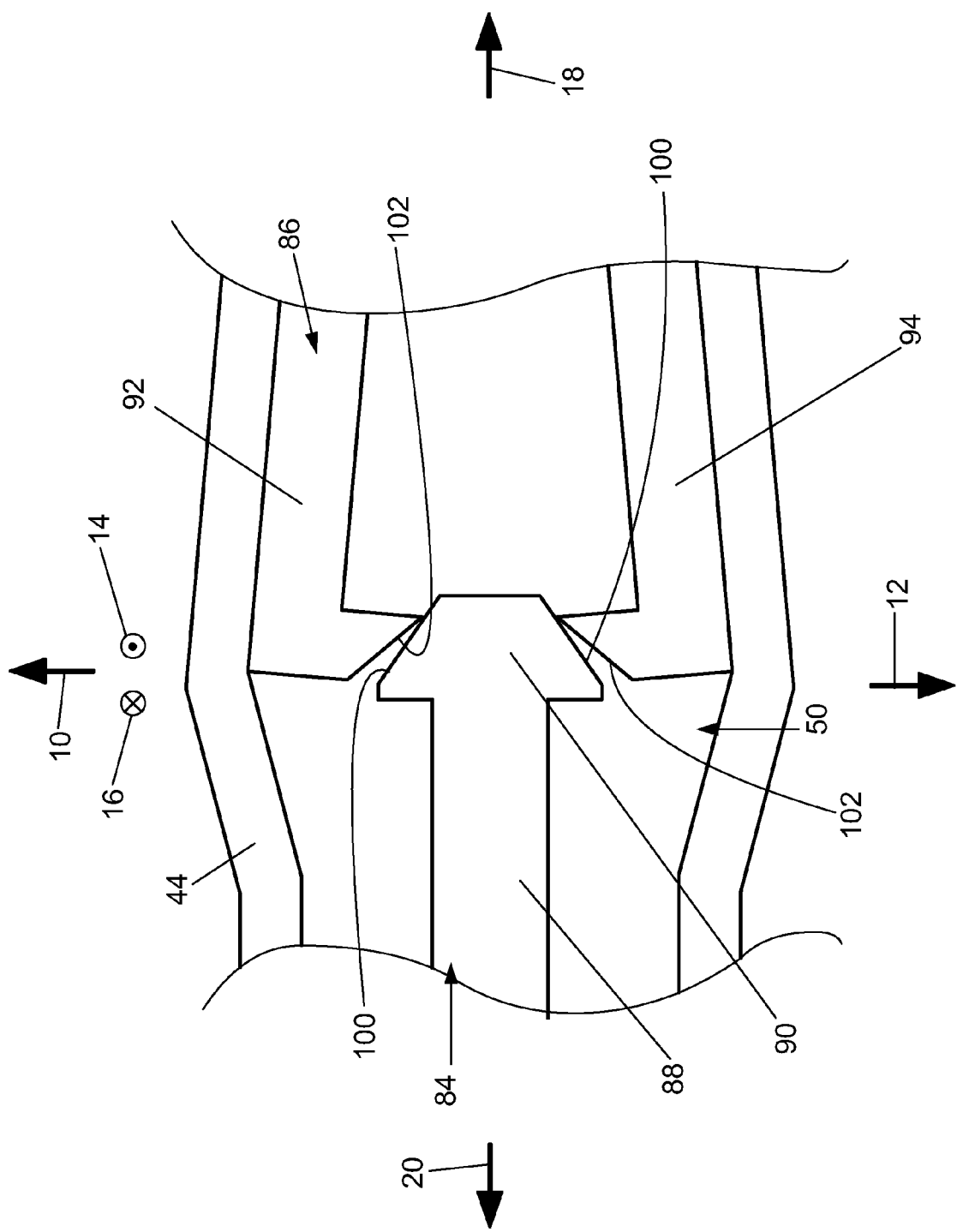
Figure 10:
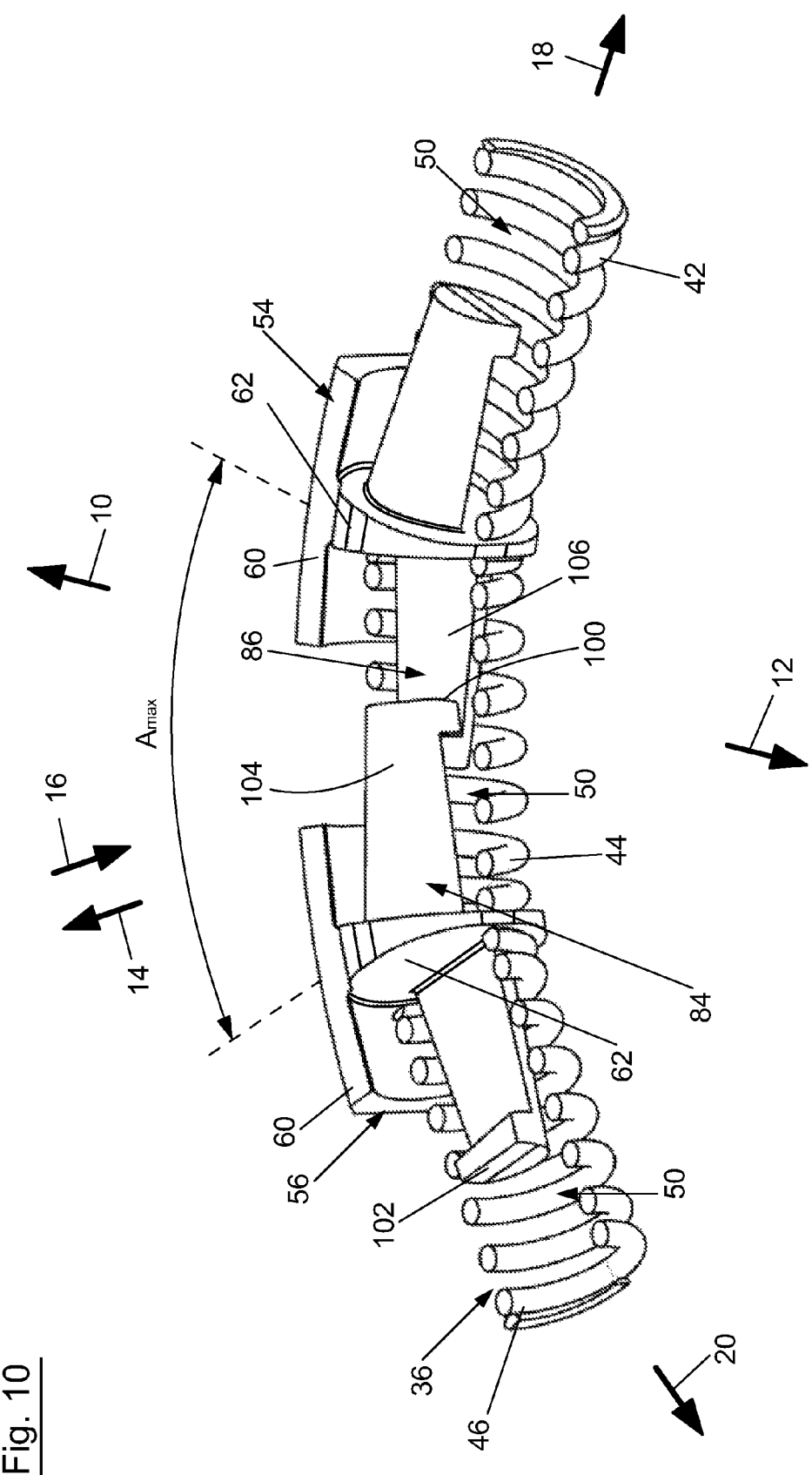
Figure 11:
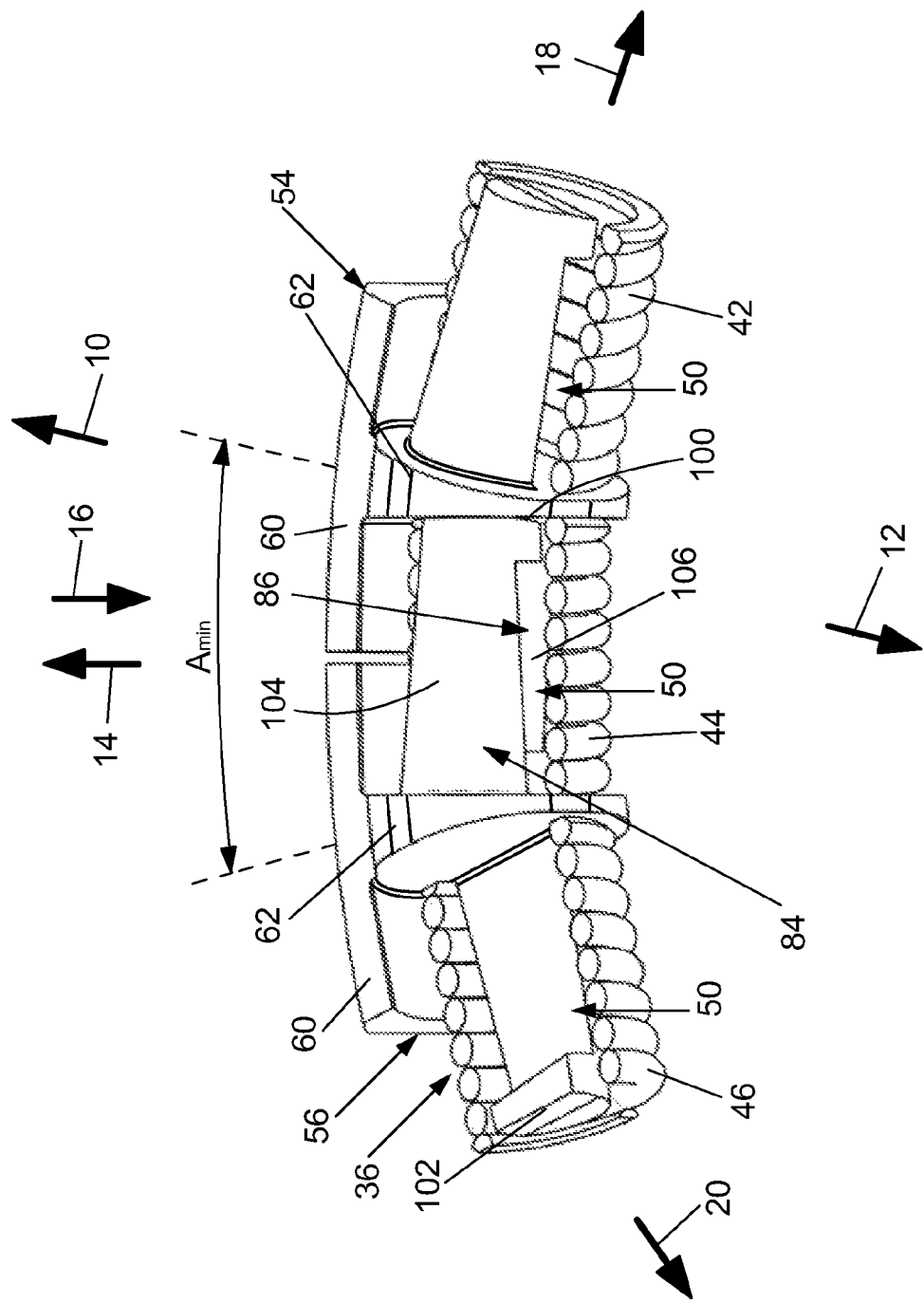

The invention is explained in greater detail below by means of illustrative embodiments with reference to the attached drawings. In the drawings:

FIG. 1 shows a front view of the fundamental construction of the torsional vibration damper according to the invention in partially sectioned representation, FIG. 2 shows a front view of the spring device from FIG. 1 in a sectioned representation in accordance with a first embodiment after the maximum spacing between the first and the second sliding shoe has been reached, FIG. 3 shows the spring device from FIG. 2 before the maximum spacing has been reached, FIG. 4 shows a front view of the spring device from FIG. 1 in a sectioned representation in accordance with a second embodiment, FIG. 5 shows a side view of a first embodiment of the sliding shoes from FIGS. 1 to 4, FIG. 6 shows a side view of a second embodiment of the sliding shoes from FIGS. 1 to 4, FIG. 7 shows a partial perspective view of the spring device from FIG. 1 in accordance with a third embodiment when the maximum spacing between the mutually adjacent sliding shoes is reached, FIG. 8 shows the spring device from FIG. 7 before the maximum spacing between the mutually adjacent sliding shoes has been reached, FIG. 9 shows a schematic representation intended to illustrate the interaction between the connecting means from FIGS. 7 and 8 as the connecting means are brought together in the course of assembly, FIG. 10 shows a partial perspective view of the spring device from FIG. 1 in accordance with a fourth embodiment after the maximum spacing between the mutually adjacent sliding shoes has been reached, and FIG. 11 shows the spring device from FIG. 10 before the maximum spacing between the mutually adjacent sliding shoes has been reached.

FIG. 1 first of all shows the fundamental construction of one embodiment of the torsional vibration damper 2 according to the invention. The torsional vibration damper 2 has a primary element 4 and a secondary element 6, which can be turned relative to one another by a certain amount about an axis 8 of rotation of the torsional vibration damper 2. The primary element 4 can form the input or output side of the torsional vibration damper 2, while the secondary element 6 can form the output or input side of the torsional vibration damper 2. The axis 8 of rotation extends in the mutually opposite axial directions 10, 12, and the mutually opposite radial directions 14, 16 and the mutually opposite circumferential directions 18, 20 of the torsional vibration damper 2 are furthermore indicated in FIG. 1 by means of corresponding arrows.

The primary element 4 is of substantially disk- or flange-shaped design and has two drivers 22, 24, which project outward in the radial direction 14 and are arranged on the primary element 4 in a manner offset relative to one another by 180 degrees in the circumferential direction 18, 20. The secondary element 6, on the other hand, is formed by two shell-shaped components, which have been assembled in the axial direction 10, 12, although only one of the components can be seen in FIG. 1. The two components enclose an annular spring space 26, which is situated on the outside in the radial direction 14, which runs around in the circumferential direction 18, 20 and into which the drivers 22, 24 of the primary element 4 extend in the radial direction 14. The secondary element 6 comprises an outer wall 28, which delimits the spring space 26 on the outside in the radial direction 14, a sliding surface 30, which surrounds the spring space 26 in the form of a circle, being provided on that side of the outer wall 28 which faces inward in the radial direction 16. In this context, the sliding surface 30 can also be referred to as a running surface. The secondary element 6 also has drivers 32, 34, which are provided on the secondary element 6, once again in a manner offset by 180 degrees relative to one another in the circumferential direction 18, 20. In the example under consideration, the drivers 32, 34 are each formed by a pair of projections on the components of the secondary element 6, said projections protruding into the spring space 26 in the axial direction 10, 12, although only one of the projections of the drivers 32, 34 can be seen in each case in FIG. 1. Thus, one protruding projection is provided on the first component of the secondary element 6, while the other protruding projection is provided on that component of the secondary element 6 which is not shown in FIG. 1. The drivers 22, 24 of the primary element 4 can be moved in the circumferential direction 18, 20 between the protruding projections of the respective driver 32, 34 on the secondary element 6.

Two spring devices 36, 38 arranged in series are arranged between the drivers 22, 24, 32, 34 and within the spring space 26 in the circumferential direction 18, 20 in order to effect torsionally elastic coupling of the primary and secondary elements 4, 6, and it is also possible here to refer to a spring-elastic rotary driving coupling. The spring devices 36, 38 shown are of substantially identical construction, and therefore the explanation which follows is limited to the description of spring device 36. However, it is self-evident that the description of spring device 36 applies mutatis mutandis also to spring device 38.

Spring device 36 has a plurality of spring elements 40 to 48, which are indicated only schematically in FIG. 1. In the embodiment shown, the spring elements 40 to 48 are helical springs that are straight or extend in a straight line and are arranged in series in the circumferential direction 18, 20. The turns of the spring elements 40 to 48, which are designed as helical springs, each surround a spring interior space 50, which cannot be seen in FIG. 1 but is visible in FIGS. 2 to 4 and 7 to 11, which follow.

A sliding shoe 52 to 58 is in each case arranged between the ends of the spring elements 40 to 48 which face one another in the circumferential direction 18, 20. Here, sliding shoes 52, 58 are designed as "end shoes" of spring device 36, which are thus arranged closest in the circumferential direction 18, 20 to the drivers 22, 32 and 24, 34 respectively associated with spring device 36. It should be noted in this context that—as a departure from the illustration in FIG. 1—respective sliding shoes could also be provided in the circumferential direction 18, 20 between spring element 40 and drivers 22, 32, on the one hand, and in the circumferential direction 18, 20 between spring element 48 and drivers 24, 34, on the other hand, in which case said sliding shoes would form the corresponding end shoes of spring device 36. In contrast, the sliding shoes 54, 56 of spring device 36 are arranged in the circumferential direction 18, 20 between sliding shoe 52, which is designed as an end shoe, on the one hand, and sliding shoe 58, which is designed as an end shoe, on the other hand, and sliding shoes 54 and 56 can therefore also be referred to as intermediately situated sliding shoes or intermediate shoes. In the embodiment illustrated, spring element 42 is thus arranged between sliding shoes 52, 54, spring element 44 is arranged between sliding shoes 54, 56, and spring element 46 is arranged between sliding shoes 56, 58, while spring element 40 is arranged between sliding shoe 52 and drivers 22, 32, and spring element 48 is arranged between sliding shoe 58 and drivers 24, 34.

The sliding shoes 52 to 58 are of substantially the same construction. Thus, the sliding shoes 52 to 58 each have a sliding section 60 extending in the circumferential direction 18, 20 for sliding support of the respective sliding shoe 52 to 58 on the sliding surface 30 in the radial direction 14, and a supporting section 62, which extends inward in the radial direction 16 from the sliding section 60, to provide support for the adjacent or adjoining spring elements 40 to 48 on the respective sliding shoe 52 to 58 in the circumferential direction 18, 20. The sliding section 60 is furthermore designed in such a way that the spring elements 40 to 48 adjoining the respective sliding shoe 52 to 58 can also be supported at least partially during the operation of the torsional vibration damper 2 on that side of the sliding section 60 which faces inward in the radial direction 16.

A spacing limitation device 64 is furthermore provided in the circumferential direction 18, 20 between at least two sliding shoes of the group comprising sliding shoes 52 to 58 in order to define a maximum spacing between the two sliding shoes in the circumferential direction 18, 20. The spacing limitation device 64, which is indicated only by a dashed line in FIG. 1, can be subdivided into a plurality of spacing limitation devices between mutually adjacent sliding shoes 52, 54; 54, 56; 56, 58 or alternatively can form a continuous spacing limitation device 64 which extends over three or more of sliding shoes 52 to 58 in the circumferential direction 18, 20, as will be described in greater detail below with reference to the embodiments in FIGS. 2 to 11.

However, as is already evident from the schematic representation in FIG. 1, the spacing limitation device 64 is not arranged outside the spring elements 40 to 48; on the contrary, the spacing limitation device 64 extends through the spring elements 42, 44, 46 of the spring device 36 in the circumferential direction 18, 20, and, in the example illustrated, the spacing limitation device 64 extends in the circumferential direction 18, 20 through the spring interior space 50 of the spring elements 42, 44, 46, which are designed as helical springs. From the schematic representation in FIG. 1, it is furthermore apparent that the spacing limitation device 64 acts between the supporting sections 62 of the sliding shoes 52 to 58 and not, for instance, between the sliding sections 60 of said sliding shoes 52 to 58. As will be explained in greater detail below with reference to FIGS. 2 to 11, the spacing limitation device 64 interacts with at least two of the sliding shoes 52 to 58 in such a way that said at least two sliding shoes of sliding shoes 52 to 58 are connected positively to one another, preferably being hooked to one another, when the at least two sliding shoes adopt the predetermined maximum spacing in the circumferential direction 18, 20.

FIGS. 2 and 3 show a first embodiment of spring device 36 in the torsional vibration damper 2 shown in FIG. 1, spring device 36 having been rolled up into a straight line to increase clarity. In the first embodiment illustrated, the spacing limitation device 64 acts between the two sliding shoes 52 and 58, which are designed as end shoes, in order to define the maximum spacing $A_{max}$ between sliding shoe 52 and sliding shoe 58 in the circumferential direction 18, 20. An aperture 66 that passes through in the circumferential direction 18, 20 is provided in each of the supporting sections 62 of the sliding shoes 52 to 58. Whereas the aperture 66 in supporting section 62 of sliding shoe 52 is widened in the circumferential direction 18 to form a receiving recess 68 on that side of supporting section 62 which faces away from sliding shoe 58, the aperture 66 in supporting section 62 of sliding shoe 58 is widened in the circumferential direction 20 to form a receiving recess 68 on that side of supporting section 62 of sliding shoe 58 which faces away from sliding shoe 52.

In this embodiment, the spacing limitation device 64 is designed as a cable 70, preferably as a steel cable. This cable 70 extends not only in the circumferential direction 18, 20 through the spring interior spaces 50 of the spring elements 42 to 46 but also through the abovementioned apertures 66 in the supporting sections 62 of the sliding shoes 52 to 58. The spacing limitation device 64 in the form of the cable 70 thus connects the spring elements 42, 44, 46 and the sliding shoes 52 to 58 to one another in the manner of a chain.

To enable the maximum spacing $A_{max}$ between sliding shoes 52 and 58 in the circumferential direction 18, 20 to be defined with the aid of the cable 70, the cable 70 furthermore has two stop parts 72. The stop parts 72 preferably consist of a thickened portion of the cable 70, a knot in the cable 70 or a press-fitted part. In each case, the stop part 72 is arranged on the cable 70 in such a way that it can be slid along the cable 70 to only a limited extent, if at all. One stop part 72 in the region of sliding shoe 52 is arranged on that side of the supporting section 62 of sliding shoe 52 which faces away from sliding shoe 58 in order to engage behind the supporting section 62 of sliding shoe 52. By contrast, the other stop part 72 in the region of sliding shoe 58 is arranged on that side of the supporting section 62 of sliding shoe 58 which faces away from sliding shoe 52 in order to engage behind the supporting section 62 of sliding shoe 58 on this side. The stop parts 72 are accommodated at least partially, and preferably completely, in the receiving recesses 68 in the supporting sections 62 of sliding shoes 52 and 58, and, as a particularly preferred option, the stop parts 72 are held in the respective receiving recess 68 by means of a clamping action—though not necessarily permanently. If the two sliding shoes 52 and 58 move away from one another to such an extent in the circumferential direction 18, 20 that the maximum spacing $A_{max}$ between them in the circumferential direction 18, 20 is reached, the spacing limitation device 64 in the form of the cable 70 is pulled taut, while the stop parts 72 are supported on the supporting sections 62 of sliding shoes 52 and 58 in the circumferential direction 20 and 18, respectively, thus preventing the two sliding shoes 52 and 58 from moving further apart in the circumferential direction 18, 20. In other words, the maximum spacing $A_{max}$ between sliding shoes 52 and 58 in the circumferential direction 18, 20 cannot be exceeded, and therefore the maximum spacing $A_{max}$ is defined by the spacing limitation device 64 in the form of the cable 70. As already indicated above, the cable 70 also simultaneously interacts with the supporting sections 62 of the intermediately situated sliding shoes 54, 56, it being possible for the intermediately situated sliding shoes 54, 56 to be slid along the cable 70, especially since no stop part 72 is assigned to the intermediately situated sliding shoes 54, 56 in the illustrated first embodiment shown in FIGS. 2 and 3.

In order to define a minimum spacing between the sliding shoes 52 to 58 as well, a projecting stop 74 is furthermore provided on at least one of the sliding shoes 52 to 58, preferably on all the sliding shoes 52 to 58, the construction and operation of the projecting stop 74 being indicated only by means of sliding shoe 56 in FIGS. 2 and 3 for the sake of greater clarity. The projecting stop 74 is formed integrally with the supporting section 62 of sliding shoe 56 and extends into the spring interior space 50 of the adjoining spring element 44 in the circumferential direction 18. If the spring device 36 is compressed in the circumferential direction 18, 20, so that the mutually adjacent sliding shoes 56 and 54 move closer together up to a minimum spacing $A_{min}$, the projecting stop 74 is supported on the supporting section 62 of the adjacent sliding shoe 54 in the circumferential direction 18 without the sliding sections 60 of the mutually adjacent sliding shoes 56 and 54 being supported on one another in the circumferential direction 18, 20. The minimum spacing $A_{min}$ is thus defined by the projecting stop 74 and this minimum spacing $A_{min}$ can no longer be undershot. Projecting stops 74 can also be provided in a corresponding manner on the other sliding shoes 52, 54 and/or 58 in order to define a minimum spacing $A_{min}$ therebetween, even if this is not shown in FIGS. 2 to 3. From FIG. 3, it can furthermore be seen that the cable 70 forming the spacing limitation device 64 is relaxed as the spring device 36 is compressed.

FIG. 4 shows a second embodiment of the spring device 36 for the torsional vibration damper 2 shown in FIG. 1, the second embodiment corresponding substantially to the first embodiment shown in FIGS. 2 and 3 and therefore only the differences will be explained below, identical reference signs will be used for identical or similar parts and the preceding description will otherwise apply mutatis mutandis.

In the second embodiment, the cable 70 forming the spacing limitation device 64 has additional stop parts 76, and these can once again preferably be thickened portions of the cable 70, knots in the cable 70 or press-fitted parts on the cable 70. In this embodiment, the additional stop parts 76 are assigned to the supporting sections 62 of the intermediately situated sliding shoes 54 and 56 in order to effect these supporting sections 62 of the respective intermediately situated sliding shoe 54, 56 too while defining a maximum spacing $A_{max}$ in the circumferential direction 18, 20 between the intermediately situated sliding shoe 54, 56, on the one hand, and another or an adjacent sliding shoe 52 to 58, on the other hand, by virtue of the fact that the additional stop parts 76 engage behind the supporting sections 62, preferably in both circumferential directions 18, 20. In this way, a maximum spacing can also be defined between one of the intermediately situated sliding shoes 54, 56 and another sliding shoe 52 to 58 of the spring device 36, as indicated by way of example in FIG. 4 by means of various maximum spacings $A_{max}$. In this second embodiment, the apertures 66 in the supporting sections 62 of the intermediately situated sliding shoes 54, 56 are widened, preferably in both circumferential directions 18, 20, to form receiving recesses 68, in which the additional stop parts 76 can be or are accommodated, and, here too, it is preferred if the additional stop parts 76 are held by means of a clamping action—though not necessarily permanently—in the receiving recesses 68.

FIG. 5 shows a first variant embodiment of the sliding shoes 52 to 58 shown in FIGS. 2 to 4. To enable the sliding shoes 52 to 58 to be connected to the spacing limitation device 64 in the form of the cable 70 in the manner described above, a receiving slot 78 is provided in the supporting section 62 of the sliding shoes 52 to 58. In the first variant embodiment illustrated, the receiving slot 78 extends in the radial direction 14, 16 between the aperture 66, on the one hand, and that edge of the supporting section 62 which faces inward in the radial direction 16, on the other hand, with the result that the cable 70 can be or is introduced into the aperture 66 transversely to the circumferential direction 18, 20, in this case in the radial direction 14. In order to prevent the cable 70 from sliding out of the aperture 66 via the receiving slot 78 during or after assembly, a retaining feature 80 is furthermore provided to retain the cable 70 arranged in the aperture 66, the retaining feature 80 in this case being formed by a constriction 82 in the receiving slot 78. The constriction 82 should have a width which is less than the diameter of the cable 70, ensuring that the cable 70 can be introduced into or removed from the aperture 66 via the receiving slot 78 only with the expenditure of an increased force and elastic deformation of the retaining feature 80 in the form of the constriction 82.

FIG. 6 shows a second variant embodiment of the sliding shoes 52 to 58 shown in FIGS. 2 to 4, said embodiment corresponding substantially to the first variant embodiment shown in FIG. 5 and therefore only the differences will be explained below, identical reference signs will be used for identical or similar parts and the preceding description of FIG. 5 will apply correspondingly.

In the second variant embodiment of the sliding shoes 52 to 58, the receiving slot 78 extends in the axial direction 10 or 12 into the aperture 66, at least in the section of said slot that faces the aperture 66. By virtue of this design, it is already possible to exclude the eventuality that the cable 70 arranged within the aperture 66 will move inward out of the aperture 66 via the receiving slot 78 in the radial direction 16. It would therefore be possible in principle to dispense with the additional retaining feature 80, even if it is preferred that the additional retaining feature 80 in the form of the constriction 82 in the receiving slot 78 be provided in this variant embodiment too, as can be seen from FIG. 6. It is also preferred if the receiving slot 78 in the second variant embodiment extends in the axial direction 12 or 10 from that edge of the supporting section 62 which faces in the axial direction 10 or 12 as far as the aperture 66 and opens into the latter.

FIGS. 7 to 9 show a third embodiment of the spring device 36 shown in FIG. 1, while FIGS. 10 and 11 show a fourth embodiment of the spring device 36 shown in FIG. 1. Both embodiments have the common feature that a spacing limitation device 64 is in each case provided between the mutually adjacent sliding shoes 52, 54; 54, 56; 56, 58, said spacing limitation device 64 being described by way of example in FIGS. 7 and 10 by means of the mutually adjacent intermediately situated sliding shoes 54 and 56. The third and fourth embodiments furthermore have the common feature that the spacing limitation device 64 has a first connecting means 84 on the supporting section 64 of one sliding shoe 56 and a second connecting means 86 on the supporting section 62 of the other sliding shoe 54. In the assembled condition, the connecting means 84, 86, which are preferably designed in the manner of a hook, engage one behind the other to effect definition of the maximum spacing $A_{max}$ between the mutually adjacent sliding shoes 56, 54 in the circumferential direction 18, 20. The connecting means 84, 86 are constructed separately from one another so as to engage positively one behind the other, the connecting means 84, 86 being formed integrally with the respective or associated supporting section 62 of the respective sliding shoe 56, 54. Moreover, the third and fourth embodiments have the common feature that the connecting means 84, 86 can be brought together in the circumferential direction 18, 20 with a latching action as they are assembled, and this can preferably be accomplished with elastic deformation of at least one of the connecting means 84, 86. As an alternative or in addition, the connecting means 84, 86 can be transferred during assembly or disassembly by a movement transverse to the circumferential direction 18, 20, in this case in the radial direction 14, 16, into the position in which the connecting means 84, 86 engage one behind the other.

In the text which follows, further details of the third embodiment, which is shown in FIGS. 7 to 9, will first of all be given, FIGS. 7 and 8 showing only a partial section of the spring device 36, although this is sufficient for an understanding of the third embodiment.

In the third embodiment of the spring device 36 for the torsional vibration damper 2 shown in FIG. 1, the first connecting means 84 is formed by a strut 88 which extends into the spring interior space 50 of the spring element 44 in the circumferential direction 18 and at the free end of which there is provided a head 90, behind which engagement is possible. The head 90 protrudes laterally beyond the strut 88 in a hook-like manner both in the axial direction 10 and in the axial direction 12. In contrast, the second connecting means 86 has two hook-shaped elements 92, 94, which are arranged opposite one another in the axial direction 10, 12 and form an intermediate free space in between. The head 90 can be or is introduced into the interspace between the hook-shaped elements 92, 94 in such a way that the hook-shaped elements 92, 94 can engage or do engage behind the head 90 on opposite sides. If the maximum spacing $A_{max}$ between the mutually adjacent sliding shoes 54, 56 has been reached, as can be seen in FIG. 7, the hook-shaped elements 92, 94 are hooked into the head 90 in such a way that a further increase in the spacing between the sliding shoes 54, 56 in the circumferential direction 18, 20 is prevented.

Moreover, in a manner similar to the embodiments shown in FIGS. 2 to 4, projecting stops 96, 98 are provided on the supporting section 62 of sliding shoe 56 and on the supporting section 62 of sliding shoe 54 respectively. The two stops 96, 98, which likewise extend into the spring interior space 50 of the spring element 44, can be supported on one another in the circumferential direction 18, 20 when the spring device 36 is compressed in the circumferential direction 18, 20 and a minimum spacing $A_{min}$ between the sliding shoes 54, 56 in the circumferential direction 18, 20 is reached, as shown in FIG. 8. Here, the two stops 96, 98 are designed in such a way that, when the minimum spacing $A_{min}$ is reached, they are supported on one another without the sliding sections 60 of the mutually adjacent sliding shoes 54, 56 being supported on one another in the circumferential direction 18, 20 and without one of the two connecting means 84, 86 being supported on the respectively adjacent sliding shoe 54; 56 in the circumferential direction 18, 20. In this case too, the projecting stop 96, 98 is preferably formed integrally with the respective supporting section 62. In this embodiment, the connecting means 84, 86 thus serve primarily to define the maximum spacing $A_{max}$ but not to define the minimum spacing $A_{min}$, and the connecting means 84, 86 are therefore relieved of load in this respect.

During assembly, the connecting means 84, 86 can be brought together in the circumferential direction 18, 20 with a latching action, as indicated schematically in FIG. 9. Here, both the head 90 and the hook-shaped elements 92, 94 have surface sections 100, 102 oriented obliquely to the circumferential direction 18, 20, which surface sections can be or are supported on one another in a sliding manner, with elastic deformation of the hook-shaped elements 92, 94 of the second connecting means 86, when the connecting means 84, 86 are being brought together as part of assembly. As they are brought together, not only is the second connecting means 86 in the form of the hook-shaped elements 92 and 94 elastically deformed but the elastic deformation of the second connecting means 86 also leads to an at least temporary elastic deformation of the surrounding spring element 44 or an elastic expansion of the spring element 44, which is designed as a helical spring, as can be seen from FIG. 9. The result is that, after assembly, there is greater protection against loss of the two connecting means 84, 86, especially as they can only be released from one another by renewed elastic expansion of the spring element 44 if release of the connecting means 84, 86 is not possible through a movement transverse to the circumferential direction 18, 20 for reasons of space.

In the fourth embodiment of the spring device 36 for the torsional vibration damper 2 shown in FIG. 1, as illustrated in FIGS. 10 and 11, both connecting means 84, 86 are formed by a simple hook-shaped element 104, 106. In contrast to the third embodiment, the fourth embodiment does not have a projecting stop 96 or 98; on the contrary, hook-shaped element 104 and hook-shaped element 106 strike against the respective supporting section 62 of the adjacent sliding shoe 56; 54 when the minimum spacing $A_{min}$ (FIG. 11) between the sliding shoes 54 and 56 is reached, and therefore, in the fourth embodiment too, the sliding sections 60 of the mutually adjacent sliding shoes 54, 56 are not supported against one another in the circumferential direction 18, 20 when the minimum spacing $A_{min}$ between the mutually adjacent sliding shoes 54, 56 is reached. In this fourth embodiment, the spacing limitation device 64 thus effects both the definition of the maximum spacing $A_{max}$ (FIG. 10) and also the definition of the minimum spacing $A_{min}$ (FIG. 11) between the mutually adjacent sliding shoes 54 and 56. A particularly simple construction is thereby achieved although, as an alternative, it is also possible for projecting stops 96 and 98 of the kind present in the third embodiment shown in FIGS. 7 to 9 to be provided in the fourth embodiment. In the fourth embodiment shown in FIGS. 10 and 11 too, obliquely oriented surface sections 100 and 102 are provided on the connecting means 84, 86, which surfaces simplify bringing together with a latching action involving at least brief elastic deformation of the connecting means 84, 86 and possibly of the surrounding spring element 44.

LIST OF REFERENCE SIGNS 2 torsional vibration damper
4 primary element
6 secondary element
8 axis of rotation
10 axial direction
12 axial direction
14 radial direction
16 radial direction
18 circumferential direction
20 circumferential direction
22 driver
24 driver
26 spring space
28 outer wall
30 sliding surface
32 driver
34 driver
36 spring device 38 spring device
40 spring element
42 spring element
44 spring element
46 spring element
48 spring element
50 spring interior space
52 sliding shoe
54 sliding shoe
56 sliding shoe
58 sliding shoe
60 sliding section
62 supporting section
64 spacing limitation device
66 aperture
68 receiving recess
70 cable
72 stop part
74 projecting stop
76 additional stop parts
78 receiving slot
80 retaining feature
82 constriction
84 first connecting means
86 second connecting means
88 strut
90 head
92 hook-shaped element
94 hook-shaped element
96 projecting stop
98 projecting stop
100 obliquely oriented surface section
102 obliquely oriented surface section
104 hook-shaped element
106 hook-shaped element
$A_{max}$ maximum spacing
$A_{min}$ minimum spacing

The invention claimed is:

1. A torsional vibration damper comprising a primary element, a secondary element and a spring device for torsionally elastic coupling of the primary and the secondary element in the circumferential direction, which spring device has at least one spring element which is arranged between a first and a second sliding shoe, a spacing limitation device being provided to define a maximum spacing ($A_{max}$) between the first and the second sliding shoe in the circumferential direction, the spacing limitation device extending through the at least one spring element in the circumferential direction.

2. The torsional vibration damper as claimed in claim 1, wherein the spacing limitation device interacts with the first and the second sliding shoe in such a way that the first and the second sliding shoe are connected positively to one another when the maximum spacing ($A_{max}$) is reached.

3. The torsional vibration damper as set forth in claim 1 wherein the first and the second sliding shoe each have a sliding section for sliding support of the sliding shoe in the radial direction and a supporting section for supporting the spring element in the circumferential direction, the spacing limitation device acting between the supporting sections.

4. The torsional vibration damper as claimed in claim 3 wherein at least one of the supporting sections has a projecting stop which extends into the spring element.

5. The torsional vibration damper as claimed in claim 3 wherein at least one of the supporting sections has a projecting stop which extends into the spring element and by means of which the supporting section is supported in the circumferential direction on the adjacent sliding shoe, thereby defining a minimum spacing ($A_{min}$) between mutually adjacent sliding shoes without the sliding sections of the mutually adjacent sliding shoes being supported on one another in the circumferential direction and one of the connecting means being supported in the circumferential direction on the adjacent sliding shoe, the projecting stop being formed integrally with the supporting section.

6. The torsional vibration damper as claimed in claim 1 wherein at least the first sliding shoe is designed as an end shoe of the spring device.

7. The torsional vibration damper as claimed in claim 6 wherein the spacing limitation device has a first hook-shaped connecting means on one sliding shoe on the supporting section of the one sliding shoe and a second hook-shaped connecting means on the other sliding shoe on the supporting section of the other sliding shoe, said connecting means extending into the spring element in the circumferential direction and engaging one behind the other, the connecting means being formed integrally with the respective sliding shoe with the supporting section of the respective sliding shoe.

8. The torsional vibration damper as claimed in claim 7 wherein the connecting means can be brought together in the circumferential direction with a latching action so that there is elastic deformation of at least one of the connecting means, elastic deformation of the surrounding spring element or elastic expansion of the helical spring to transfer said connecting means, by a movement transverse to the circumferential direction into the position in which the connecting means engage one behind the other.

9. The torsional vibration damper as claimed in claim 8 wherein the first connecting means has a head behind which engagement is possible, while the second connecting means has at least two hook-shaped elements between which the head can be introduced in such a way that there is engagement behind the head on opposite sides, by the hook-shaped elements, the two hook-shaped elements being arranged opposite one another in the axial direction.

10. The torsional vibration damper as claimed in claim 1 wherein the spacing limitation device is designed as a cable.

11. The torsional vibration damper as claimed in claim 10; wherein at least one of the first or second sliding shoes comprise: a sliding section; and a supporting section; and wherein the cable extends through an aperture in the supporting section of at least one of the first or second sliding shoe and has a stop part.

12. The torsional vibration damper as claimed in claim 11 wherein a receiving slot is provided in the supporting section via which slot the cable can be or is introduced into the aperture transversely to the circumferential direction, a retaining feature for retaining the cable within the aperture.

13. The torsional vibration damper as claimed in claim 11 wherein at least one of the apertures in the supporting section is widened in the circumferential direction to form a receiving recess in which the stop part is at least partially accommodated.

14. The torsional vibration damper as claimed in claim 10 wherein the spring device has at least two or more spring elements and intermediately situated sliding shoes situated between the first and the second sliding shoe in the circumferential direction arranged between the spring elements; wherein the intermediately situated sliding shoes comprise: a sliding section; and a supporting section; the cable extending through the spring elements in the circumferential direction and connecting the sliding shoes in the manner of a chain, and the cable interacting with the supporting section of the respective intermediately situated sliding shoe.

15. The torsional vibration damper as claimed in claim 14 wherein the cable has two or more stop parts, knots or press-fitted parts, by means of which engagement behind the supporting section of the respective intermediately situated sliding shoe can be or is achieved, thereby defining a maximum spacing ($A_{max}$) in the circumferential direction between the intermediately situated sliding shoe on the one hand, and another or adjacent sliding shoe on the other hand.

16. The torsional vibration damper as claimed in claim 1 wherein the spacing limitation device has a first connecting means on one sliding shoe and a second connecting means on the other sliding shoe, said connecting means extending into the spring element in the circumferential direction and engaging one behind the other.

17. The torsional vibration damper as claimed in claim 16, wherein the connecting means are brought together in the circumferential direction with a latching action.

18. The torsional vibration damper as claimed in claim 17 wherein the first connecting means has a head and the second connecting means has at least two hook-shaped elements.

19. The torsional vibration damper as claimed in claim 17 wherein the connecting means have surface sections oriented obliquely to the circumferential direction.

20. The torsional vibration damper as claimed in claim 17 wherein the connecting means have surface sections oriented obliquely to the circumferential direction, which surface sections are supported on one another in a sliding manner when the connecting means are being brought together in a manner which involves elastic deformation of at least one of the connecting means.

21. A torsional vibration damper as set forth in claim 1 wherein the spring device comprises a helical spring.

22. The torsional vibration damper as claimed in claim 1 wherein the spacing limitation device interacts with the first and the second sliding shoe in such a way that the first and the second sliding shoe are hooked to one another when the maximum spacing ($A_{max}$) is reached.

23. The torsional vibration damper as set forth in claim 1 wherein the first and the second sliding shoe each have a sliding section extending in the circumferential direction for sliding support of the sliding shoe in the radial direction, and a supporting section extending in the radial direction for supporting the spring element in the circumferential direction, the spacing limitation device acting between the supporting sections.

24. The torsional vibration damper as claimed in claim 1 wherein at least the first sliding shoe and the second sliding shoe are designed as an end shoe of the spring device.

25. The torsional vibration damper as claimed in claim 1 wherein the spacing limitation device comprises a steel cable.

26. The torsional vibration damper as claimed in claim 25; wherein at least one of the first or second sliding shoes comprise: a sliding section; and a supporting section; and wherein the cable extends through an aperture in the supporting section of the first or second sliding shoe and has a stop part comprising a thickened portion, a knot or a press-fitted part, by means of which engagement behind the supporting section of the first or second sliding shoe is achieved.

27. The torsional vibration damper as claimed in claim 26 wherein a receiving slot is provided in the supporting section via which slot the cable is introduced into the aperture transversely to the circumferential direction, a retaining feature for retaining the cable within the aperture, said retaining feature particularly being formed by a constriction in the receiving slot.

28. The torsional vibration damper as claimed in claim 26 wherein at least one of the apertures in the supporting section is widened in the circumferential direction to form a receiving recess, in which the stop part is at least partially accommodated, the stop part being held in the receiving recess by means of a clamping action.

29. The torsional vibration damper as claimed in claim 25 wherein the spring device has at least two or more spring elements and intermediately situated sliding shoes situated between the first and the second sliding shoe in the circumferential direction, are arranged between the spring elements, the cable extending through the spring elements in the circumferential direction and connecting the sliding shoes in the manner of a chain, each of the intermediately situated sliding shoes having a sliding section for sliding support of the intermediately situated sliding shoe in the radial direction, and a supporting section for supporting the spring element in the circumferential direction and the cable interacting with the supporting section of the respective intermediately situated sliding shoe and the cable extending through an aperture in the supporting section of the respective intermediately situated sliding shoe.

30. The torsional vibration damper as claimed in claim 29 wherein the cable has at least one additional stop part comprising a thickened portion, a knot or a press-fitted part, by means of which engagement behind the supporting section of the respective intermediately situated sliding shoe can be or is achieved, thereby defining a maximum spacing ($A_{max}$) in the circumferential direction between the intermediately situated sliding shoe on the one hand, and another or adjacent sliding shoe on the other hand.

* * * * *